(12) United States Patent
Vincenzi et al.

(10) Patent No.: US 12,319,595 B2
(45) Date of Patent: Jun. 3, 2025

(54) MODULAR PHOTOCATALYTIC SYSTEM

(71) Applicant: UNIVERSITA' DEGLI STUDI DI FERRARA, Ferrara (IT)

(72) Inventors: Donato Vincenzi, Ferrara (IT); Micol Boschetti, Ferrara (IT); Paolo Bernardoni, Ferrara (IT); Carlo Alberto Bignozzi, Ferrara (IT); Stefano Caramori, Ferrara (IT); Vito Cristino, Ferrara (IT); Luisa Pasti, Ferrara (IT)

(73) Assignee: UNIVERSITA' DEGLI STUDI DI FERRARA, Ferrara (IT)

( * ) Notice: Subject to any disclaimer, the term of this patent is extended or adjusted under 35 U.S.C. 154(b) by 468 days.

(21) Appl. No.: 17/617,637

(22) PCT Filed: May 19, 2020

(86) PCT No.: PCT/IB2020/054725
§ 371 (c)(1),
(2) Date: Dec. 9, 2021

(87) PCT Pub. No.: WO2020/260971
PCT Pub. Date: Dec. 30, 2020

(65) Prior Publication Data
US 2022/0242752 A1     Aug. 4, 2022

(30) Foreign Application Priority Data
Jun. 26, 2019   (IT) .................. 102016000010164

(51) Int. Cl.
  *C02F 1/30*       (2023.01)
  *C02F 1/461*      (2023.01)
  (Continued)

(52) U.S. Cl.
  CPC ............ *C02F 1/30* (2013.01); *C02F 1/46109* (2013.01); *C02F 1/4676* (2013.01);
  (Continued)

(58) Field of Classification Search
  CPC ........... C25B 1/003; C25B 1/06; C25B 11/07; C25B 1/55; H01G 9/20; H01L 31/04;
  (Continued)

(56) References Cited

U.S. PATENT DOCUMENTS 4,793,910 A   12/1988  Smotkin et al.
11,492,713 B2 * 11/2022  Pisciotta ................. C25B 15/04

FOREIGN PATENT DOCUMENTS

CN    104341002 A    2/2015
CN    105481048 A    4/2016
(Continued)

*Primary Examiner* — Walter D. Griffin
*Assistant Examiner* — Cameron J Allen
(74) *Attorney, Agent, or Firm* — ArentFox Schiff LLP; Michael Fainberg (57) ABSTRACT

A fully stand-alone modular system which integrates tandems of photo-anodes and photovoltaic cells in a photo-electrochemical cell configuration.

Such a system consists of devices capable of using only solar energy, in particular by utilizing the visible spectrum, so as to decontaminate the wastewater from emerging pollutants, with the simultaneous production of hydrogen as an added value to the decontamination process, by means of photocatalytic processes.

16 Claims, 5 Drawing Sheets (51) Int. Cl.
*C02F 1/467* (2023.01)
*C02F 101/30* (2006.01)

(52) U.S. Cl.
CPC ............... *C02F 2001/46133* (2013.01); *C02F 2101/30* (2013.01); *C02F 2201/009* (2013.01); *C02F 2305/10* (2013.01)

(58) Field of Classification Search
CPC ......... Y02E 10/54; Y02E 60/36; Y02E 70/10; Y02P 20/13; C02B 9/66
See application file for complete search history.

(56) References Cited

FOREIGN PATENT DOCUMENTS

| | | | | |
|---|---|---|---|---|
| GB | 2414243 A | 11/2005 | | |
| WO | 0102624 A1 | 1/2001 | | |
| WO | WO-0145192 A1 * | 6/2001 | ............. | C25B 15/00 |
| WO | WO-2007066087 A2 * | 6/2007 | ............. | C25B 1/003 |
| WO | 2017192101 A1 | 11/2017 | | |
| WO | WO-2018033886 A1 * | 2/2018 | ............... | C25B 1/04 |

\* cited by examiner

MODULAR PHOTOCATALYTIC SYSTEM

CROSS-REFERENCE TO RELATED APPLICATIONS

This application is a National Phase Application of PCT International Application No. PCT/IB2020/054725, having an International Filing Date of May 19, 2020 which claims priority to Italian Application No. 102019000010164 filed Jun. 26, 2019, each of which is hereby incorporated by reference in its entirety.

FIELD OF THE INVENTION

The present invention relates to a solar device consisting of a fully stand-alone modular system which integrates tandems of photo-anodes and photovoltaic cells in a photo-electrochemical cell configuration.

The basis of the invention is the solar radiation exposure of the photo-anode, mainly consisting of a semiconductor material, capable of absorbing a first portion of the spectrum, allowing the photo-oxidation of the organic substances contained in water and favoring the transmission of a second portion of the solar spectrum, for which the photovoltaic device has a high conversion efficiency and allows the potential of the photo-anode to be raised with respect to the cathode electrode for the generation of solar hydrogen as an added value to the decontamination process.

In this invention, the single photo-electrochemical cell, generally consisting of anode, cathode and electrolyte, consists of a photo-anode, preferably of tungsten trioxide, a cathode made of metal material and, as an electrolyte, wastewater may be used, originating from urban and industrial discharges.

The feature which differentiates the present invention from the background art, is the inclusion of electronic components in the device, which allow to utilize photovoltaic cells, preferably made of silicon, for raising the potential, useful for the production of solar hydrogen. The presence of a programmable microcontroller integrated in the device, allowing polarization and depolarization cycles to be carried out, which are advantageous for restoring the efficiency of the photo-anode, is fundamental.

BACKGROUND OF THE INVENTION

In recent years, the world population has increased significantly, and freshwater resources must be such as to meet the increasing demand for drinking water.

In this regard, the scientific community has shown an increasing and concerned interest in a class of pollutants referred to as "emerging organic micropollutants".

The industrialization of many countries involves a global use of chemicals, such as paints or cleaning products, which are increasingly difficult to degrade. The fashion sector, for example, is positioned in second place, after oil & gas, among the most polluting sectors for the use of dyes and chemicals required for the treatment of fabrics. Such products are found in the form of pollutants in industrial wastewater and are then poured into surface water basins. Even pesticides used in agriculture or antibiotics and growth stimulants, used in intensive farming, are a danger to human health due to infiltrations in the subsoil and therefore in groundwater.

In addition, in recent decades, a sharp increase in the use and abuse by humans of substances such as antibiotics, prescription and illegal drugs has been observed.

The onset of the presence of these categories of pollutants, which put at risk the protection of human health and the environment, explains the name of "emerging" with respect to conventional pollutants. Fortunately, the low concentrations thereof in waste and primary waters allow to classify them as "micropollutants".

At European level, the issue is addressed both from the point of view of the sources of production and use, as well as from the point of view of the controls over the amount of emerging organic micropollutants released into surface water bodies.

Due to the more stringent regulations related to the quality of drinking water and effluents, the need to implement innovative systems to support current decontamination plants which are uncapable of fully removing micropollutants from industrial, urban, or domestic wastewater is becoming ever greater.

Current wastewater treatment plants have a water line and a line for sludge which originates during the treatment steps.

The water line consists of a series of treatment steps. Most mechanical processes correspond to primary pretreatments and treatments; secondary treatments comprise biological processes and those of the tertiary type include chemical-physical treatments. The chemical-physical processes comprise neutralization, redox, chemical precipitation, stripping, activated carbon adsorption, ion exchange, electrodialysis, reverse osmosis, ultrafiltration, disinfection, breakpoint chlorination.

Among these, ozone is employed as an innovative method for disinfecting and removing micropollutants, but it has the disadvantage of being a highly unstable, and therefore dangerous, gas and highly expensive as treatment system. Furthermore, ozone photolysis processes (WO 2017192101) tend to consume a lot of energy due to the low water solubility of $O_3$, and are affected by drawbacks including the high use of chemical reagents.

The various chemical-physical processes include those based on the usage of sunlight, in particular photo-electrochemical processes. Such processes usually utilize photo-electrochemical cells (PECs) so as to produce hydrogen. In reality, the basic experimental setup which allows the photodegradation of pollutants and the production of solar hydrogen is the same. A photo-electrochemical cell conventionally consists of the coupling between a photo-anode made of semiconductor material and a cathode, both immersed in an electrolytic solution.

The photo-anode consists of a catalyst which is activated by solar radiation by starting the photocatalysis process, which allows the photodegradation of the organic substances contained in water. On the cathode, instead, reduction reactions occur with consequent formation of hydrogen according to the following equations:

$$2H_2O + 4H^+ \rightarrow O_2 + 4H^+;\ E^0 = 1.23\text{V vs. NHE (in the anode compartment of the cell)}$$

$$4H^+ + 4e^- \rightarrow 2H_2;\ E^0 = 0\text{V vs. NHE (in the cathode compartment of the cell)}$$

Unfortunately, while the latter proton reduction reaction is relatively simple, the photo-oxidation of the water, which occurs in the anode contact, is not a simple reaction. This is due to fact that the request for the loss of 4 electrons and 4 protons is demanding from the thermodynamic and kinetic point of view. In fact, the formation of intermediate hydroxyl radicals requires a potential of 2.85V:

$$H_2O \rightarrow OH^-(aq) + H^+(aq) + e^-;\ E^0 = 2.85\text{V}$$

Such requests may be met by using some metal oxides whose band gap is favorable for the formation of intermediate OH⁻ radicals.

Photo-anodes based on metal oxides, such as titanium dioxide $TiO_2$, tungsten trioxide $WO_3$ and hematite $\alpha$-$Fe_2O_3$, have been widely studied by virtue of the chemical stability thereof in aqueous solution and the high rate of current generated by incident radiation when they operate in PEC cells. In particular, $WO_3$ shows better charge transfer and conductivity properties with respect to hematite, and absorbs a portion of the visible, compared to $TiO_2$ which only works in the UV range.

An important parameter which falls within the chemical features of wastewater and is related to the degradation processes of organic substances is chemical oxygen demand (COD). Such a parameter represents the amount of oxygen per unit of volume, and therefore the concentration, required to chemically oxidize the organic substances, biodegradable and not, present in a sample of wastewater. The abatement thereof, in percentage, results in the abatement of the organic load present in the wastewater.

SUMMARY OF THE INVENTION

To frame the background art so as to understand the background of the invention, some patent documents are cited concerning different applications of the more general photo-electrochemical cells highlighting the features and the operation thereof, in comparison with the device of the present invention.

In particular, patent documents related to the treatment of water by oxidation, by means of a photocatalytic action, are provided below.

CN 104341022 A describes a treatment device comprising a sedimentation tank, a water collection tank, coupled with a series of UV lamps, and a surface fluidization tank. The internal walls of the sedimentation and collection tanks are coated with nano-photocatalytic material.

CN 105481048 A describes a reactor for treating water by means of visible light photocatalytic oxidation. The external casing mainly consists of a catalytic layer and an LED lamp. As a catalyst, a titanium-cobalt alloy is used on a phthalocyanine surface. The polluted water enters from the bottom of the reactor and slowly penetrates the reaction layer. The latter excites the hydroxyl radicals, the oxygen radicals, and the hydrogen peroxide under visible light irradiation so as to oxidize pollutants and decompose gases.

CN 104341022 A describes a photocatalytic oxidation method in UV radiation, comprising the addition of a catalyst uniformly mixed with the wastewater. The catalysts used are $TiO_2$, CdS and $V_2O_5$. The compound obtained is passed into a reaction tank and is illuminated by UV radiation, preferably at 185 or 254 nm by adding ozone or air to trigger the oxidation reactions, thus obtaining carbon dioxide and water.

The three documents cited use, as a source of UV or visible radiation, UV or LED lamps which must therefore be powered and do not require the presence of an actual photo-anode, since the catalyst is distributed on the walls of the tanks or is directly mixed with the solution. Unlike the device of this invention, therefore, the cited documents require an external power supply and do not provide the presence of a photo-anode and a self-powered electronic part which allows a constant efficiency of the photo-anode itself.

Many patent documents describe devices for the photo-electrolysis of water ("water splitting"): the first researches with $TiO_2$ and Pt electrodes date back to the work of Honda et al., (Nature, (1972), v. 238, p. 37). Patent document U.S. Pat. No. 4,793,910 A is of a few years later, representing one of the first multi-electrode photo-electrochemical cells, containing at least two bipolar electrodes to produce $H_2$ and $O_2$ without external bias, illuminated by a xenon lamp. One of the embodiments provides a bipolar $TiO_2$/Pt multi-electrode photo-electrochemical cell manufactured with five panels in series.

The two patent publications cited below describe solutions which are similar in terms of structure and operation, but still lacking the electronic component with which the device of the present invention is equipped, allowing to maintain the efficiency of the photo-anode, and they do not combine the water decontamination use.

WO 0102624 A1 substantially describes a Grätzel cell, i.e., a tandem photo-electrochemical system consisting of two cells electrically connected in series, which allows the process of separating water into hydrogen and oxygen by means of visible light. The photo-active material is a semiconductor oxide, such as $WO_3$ or $Fe_2O_3$ in contact with the aqueous solution. Such a material absorbs radiation in blue and green wavelengths, generating protons and oxygen from the water. The red and yellow components of the solar spectrum, not absorbed by the photo-active material, are transmitted to a second photo-cell mounted in the direction of the incident light on the back of the first one, comprising a $TiO_2$-based Dye-Sensitized Solar Cell (DSSC). Such a system, therefore, does not provide for the use of photovoltaic cells, preferably of Si, directly integrated on the electronic circuit.

GB 2414243 describes a photo-electrochemical system for dividing an electrolyte into hydrogen by means of the use of light, and consisting of two electrically connected cells. The first one includes a photo-active electrode comprising a glass substrate coated with a conductive layer and a $WO_3$ film, operational when in contact with the electrolyte, absorbing light and producing photons. The second cell involves the use of photovoltaic cells of Si, instead of the $TiO_2$-based DSSC, increasing the voltage, improving durability and being less expensive. The pumping and hydrogen collection system is also described for this device. However, also in this case, no electronic components are mentioned which allow polarization cycles for the maintenance of photo-anode efficiency.

As previously anticipated, the two issues of pollutant photodegradation and solar hydrogen production are often dealt with separately when the basic setup is the same.

The alternative way is to utilize the photo-electrochemical system for both organic substance oxidation and hydrogen production purposes. In this regard, the following patent document is cited, in which, however, the presence of electronic circuits is not indicated.

WO 2017192101 describes a photo-electrochemical cell which comprises at least one cathode and at least one anode, in which the anode is made of a material ($WO_3$ is not cited) configured for the anodic oxidation reaction on the wastewater, and at least one, between the anode and the cathode, comprises an optically permeable material, configuring the cathode for cooperating with the anode to drive one or more cathodic reduction reactions in the presence of wastewater.

SOLUTION TO THE TECHNICAL PROBLEM

This invention relates to a stand-alone modular photocatalytic device based on tandems of photo-anodes 1 preferably of colloidal tungsten trioxide 2 and photovoltaic cells 7 preferably made of silicon.

Unlike the devices listed in the previous patent documents, the system of the present invention utilizes the tandem cell configuration both for the purpose of removing the organic load as well as for the production of hydrogen as an added value to the decontamination process.

With reference to the patent document WO 2007094019, the colloidal $WO_3$ film 2 is made by means of the sol-gel method. The technique involves the formation of a transparent colloidal $WO_3$ solution. Such a colloidal solution is formed by treating a tungstate salt, preferably an alkali metal tungstate such as sodium tungstate, in an acidic medium to result in a $WO_3$ gel. The reaction is carried out in a proton solvent, preferably water, to which a strong mineral acid, such as hydrochloric acid, is preferably added. To make the solution colloidal, the gel is added to carboxylic or polycarboxylic acid.

The colloidal paste obtained using such a procedure may be advantageously deposited by means of screen printing or doctor blading, reducing actual costs. The result is a film with a thickness of up to 2-3 microns required by photo-electrochemical systems so as to generate high photocurrents.

The semiconductor oxide 2, like tungsten trioxide, therefore acts as a catalyst. Such a catalyst directly adheres to a conductive glass substrate 3 which forms the insulation window between the external environment (water to be treated) and the internal part of the device.

The external surface 10 of the glass substrate is made conductive by the presence of a thin film of Fluorine doped Tin Oxide 4 (FTO) preferably deposited by spray pyrolysis. Such a film is capable of forming an electrical contact with the $WO_3$ 2 deposited above it, by virtue of low resistivity, and, furthermore, it is also optically transparent to the incident radiation 9.

The $WO_3$ 2 film is opaque to UV radiation and to the portion of visible solar radiation with a wavelength less than about 435 nm. In such a spectral range, the catalyst 2 is photo-excited, producing the OH radicals useful for the degradation of the organic substances contained in water, with which the catalyst 2 itself is in direct contact.

The radiation with a longer wavelength 12 is, instead, transmitted by means of the photo-anode 1, reaching the photovoltaic devices 7. Such photovoltaic cells 7 are located inside the device which faces towards the internal surface 11 of the glass and generate a 2V potential difference used to raise the potential of the photo-anode 1 with respect to the cathode 5. Such a process allows the electrons accumulated in the cathode contact to be used for the generation of hydrogen. In fact, oxidation and reduction reactions occur only when the photo-generated electron-hole pairs have the necessary redox potential.

Although functional maintenance is not necessary, $WO_3$, like all semiconductor oxides, is subject to saturation effects which limit the photocatalytic capacity under operating conditions, due to polarization effects, which are the consequence of the presence of high bias values. Therefore, reverse polarization cycles, which allow the restoration of the efficiency of the photo-anode 1, are necessary.

For this reason, the integration of a printed circuit 15 which, in addition to integrating the photovoltaic cells 7 on the side 18 facing the photo-anode 1, houses the electronic components 22 driving the anode biasing, which are welded on the side of the circuit 21 facing the cathode 5, is provided inside the device of this invention.

Such a feature differentiates the device of the present invention from all the devices described in the mentioned patent documents.

BRIEF DESCRIPTION OF THE DRAWINGS

The features and advantages related to the present invention will be better understood from the following detailed description with reference to the accompanying drawings, merely provided by way of explanation and not by way of limitation, in which.

DETAILED DESCRIPTION

Figure 1:
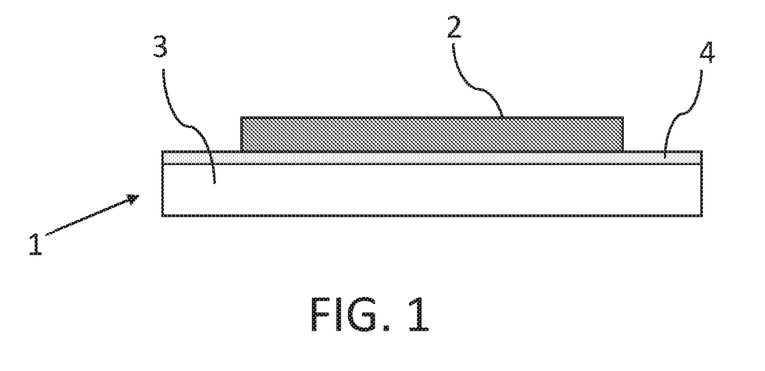
FIG. 1 diagrammatically shows the photo-anode integrated in the device.

FIG. 1 shows the diagrammatic depiction of the photo-anode 1 integrated in the device of the present invention. Such an anode electrode 1 consists of:
a semiconductor oxide film 2, preferably $WO_3$, which acts as a catalyst with the function of absorbing the solar radiation by converting it into electron-hole pairs with activation energy such as to allow the demolition of the organic compounds present in the aqueous solution;
a glass substrate 3 made conductive by the presence of a layer of conductive FTO film 4 deposited between the substrate and the semiconductor oxide.

The key component of a photo-electrochemical system is the photo-electrochemical cell.

Figure 2:
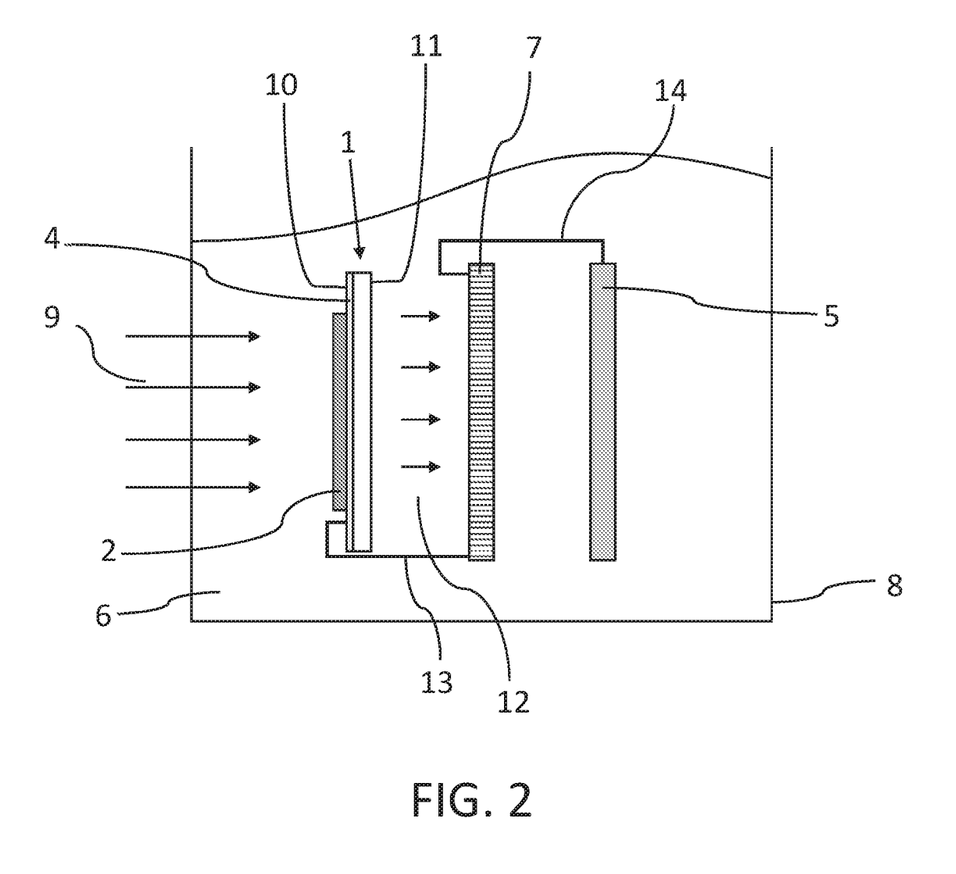
FIG. 2 is a diagrammatic depiction of the key elements of the photo-electrochemical cell coupled to the photovoltaic cells, viewed in section and placed inside a compartment containing the aqueous solution to be treated.

FIG. 2 diagrammatically shows the basic elements of the photo-electrochemical cell (photo-anode 1, cathode 5 and aqueous solution 6) which uses photovoltaic cells 7 and is inserted inside a compartment 8 containing the aqueous solution to be treated 6. The photo-anode 1 is placed in a tandem configuration with the photovoltaic cells 7.

The radiation 9 enters the system from the left in the Figure passing through the container 8, preferably made of glass or plexiglass, and the aqueous solution 6. Such a radiation then affects the external surface 10 of the photo-anode 1 on which $WO_3$ (2) and FTO 4 are partially deposited. The photo-anode 1 separates the aqueous solution 6, on the outside of the device, from the internal part where the photovoltaic cells 7 are present.

The internal part of the device, facing towards the internal surface 11 of the glass substrate, contains the photovoltaic cells 7, preferably made of monocrystalline silicon, with interdigitated rear contacts and connected in series, preferably in a number equal to 4 modules, each with 64 $mm^2$ of area.

Such cells are fed by the part of radiation 12 not absorbed by the photo-anode 1 and therefore transmitted towards the internal part of the device. Such modules, with respect to the cathode 5, increase by about 2V the potential of the photo-anode 1, to which they are connected by means of the electrical contact 13, ensuring maximum charge separation efficiency and maximum speed of photo-oxidation, direct or mediated by organic substances.

Finally, the photovoltaic cells 7 are connected to the metal cathode 5 by means of the electrical contact 14. Thereby, the voltage supplied allows the electrons, accumulated on the cathode contact during the redox processes, to be used for the production of hydrogen.

Figure 3:
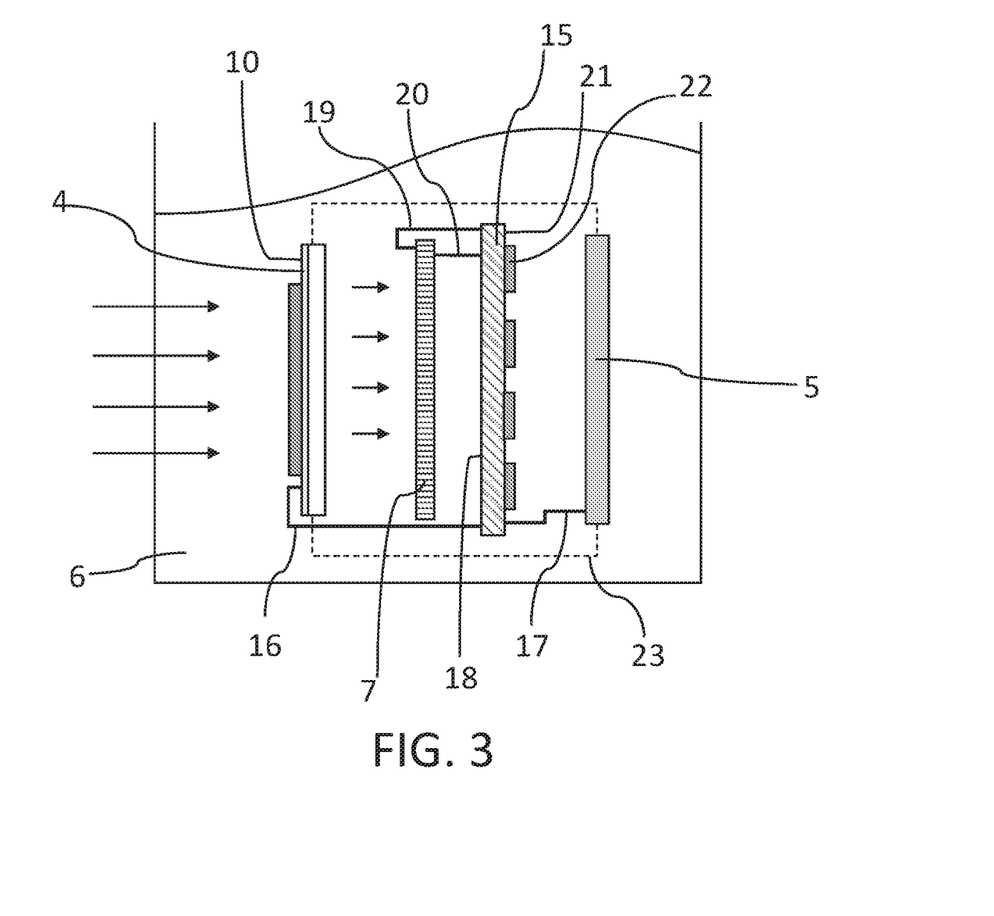
FIG. 3 shows the diagram of the single device viewed in section and placed inside the aqueous solution to be treated.

FIG. 3 shows the diagram of the cross-section of the device of the present invention. With respect to the photo-electrochemical cell in tandem configuration with the photovoltaic cells 7 described in FIG. 2, the complete device is described.

On the internal part of the device there is a printed circuit 15, or Printed Circuit Board (PCB). Such an element is in contact with the conductive FTO layer 4 of the photo-anode 1 and with the cathode 5, respectively by means of the contacts 16 and 17. The electronic circuit 15 directly integrates, on the surface 18, facing towards the photo-anode 1, the photovoltaic cells by creating the contacts 19 and 20 with the positive and negative contacts of the photovoltaic cells 7, respectively.

On the surface of the PCB 21 facing the cathode, the electronic components 22 are, instead, integrated, for driving the anode biasing capable of managing, in particular by means of the microprocessor, polarization and depolarization cycles necessary for restoring the photocatalytic efficiency of the photo-anode 1. Such a microprocessor is directly motorized by the photovoltaic cells 7 and suitably programmed to supply the required voltage in the times required.

The device is enclosed inside an external shell 23, preferably made of PVC, which encloses the entire tandem cell and the electronic circuit 15, leaving only the external surface 10 of the photo-anode 1 and the cathode 5 exposed to water.

The photovoltaic cells 7, the printed circuit 15 and the electronic components 22 must not be exposed to the aqueous solution 6, therefore, the device is protected by an encapsulant directly placed on the side 21 of the printed circuit which makes it impermeable to water, resistant to temperature and to corrosion.

Figure 4:
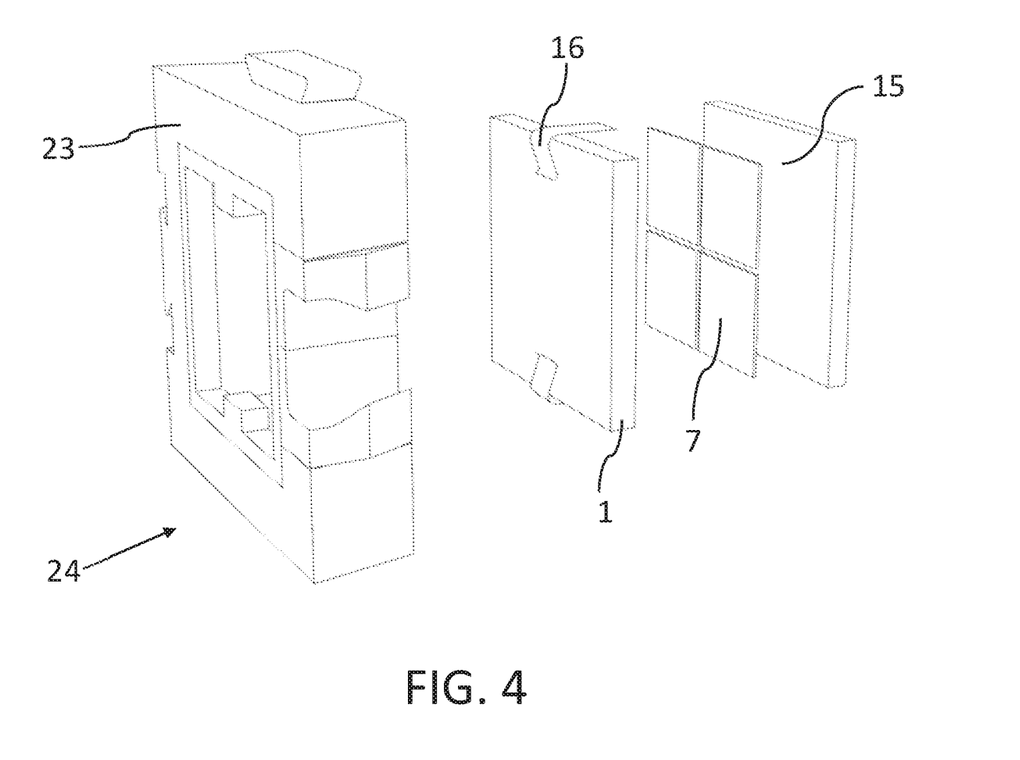
FIG. 4 shows a depiction of the individual device.

FIG. 4 shows the depiction of the device 24 in the individual components, diagrammatically described in FIG. 3, highlighting the arrangement and connections between the various parts.

Figure 5:
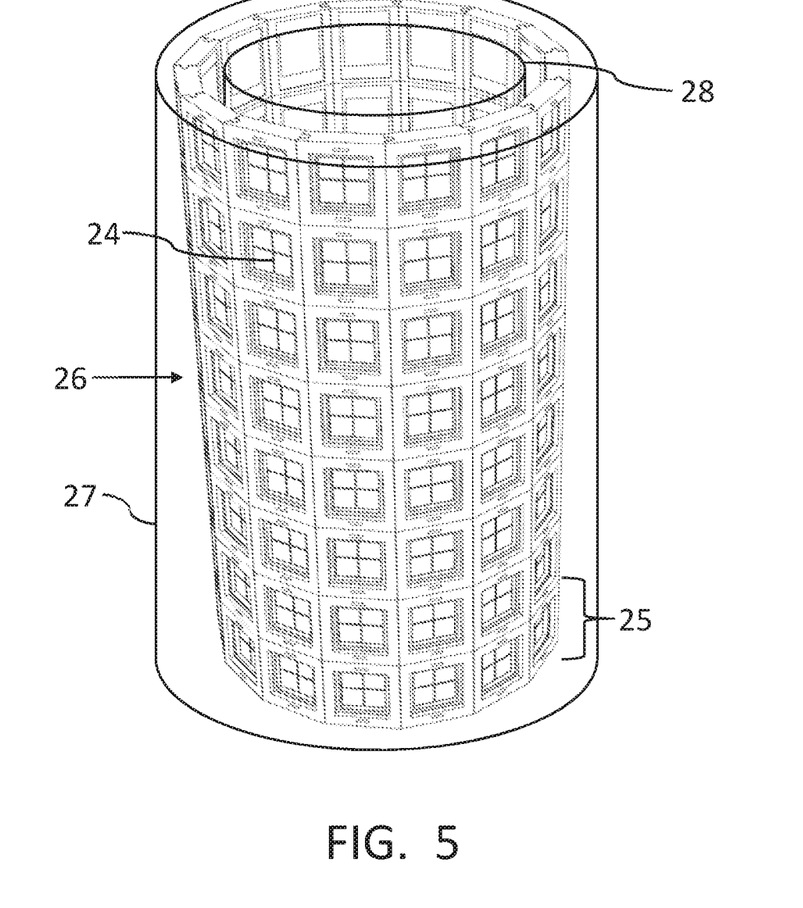
FIG. 5 shows a depiction of the modular system consisting of the individual devices.

FIG. 5 shows the depiction of the modular system consisting of the individual devices 24, assembled next to one another in a ring configuration 25. Each ring 25 is then stacked with other rings in a cylindrical structure 26. Such a structure is inserted, together with the aqueous solution 6, in the gap of two surfaces, also of a cylindrical shape, one external 27 and one internal 28.

Figure 6:
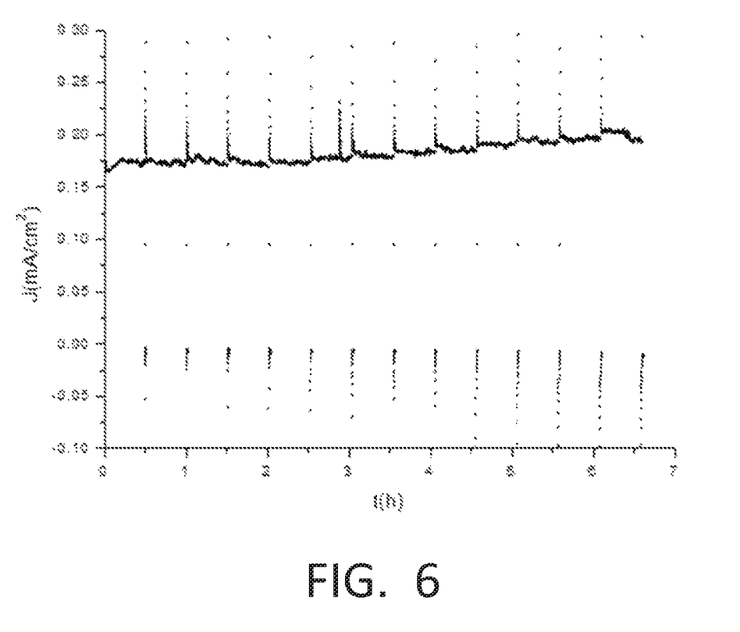
FIG. 6 shows the graph of the trend of the photocurrent produced by the photo-anode.

FIG. 6 shows the graph of the trend of the photocurrent produced by the photo-anode 1. Chrono-amperometry measurements were made, evaluating the photocurrent produced by the photo-anode as a function of time.

Figure 7:
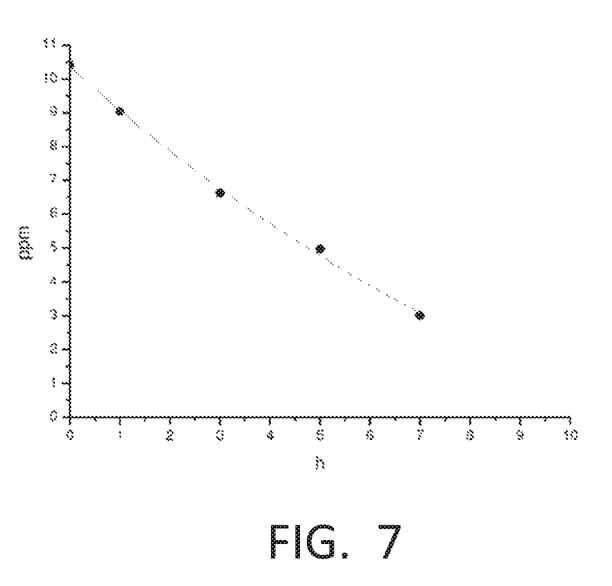
FIG. 7 shows the COD abatement results.

FIG. 7 shows the graph related to the COD abatement results obtained using the device of the present invention on 22.5 ml of a solution of atenolol 10 ppm and $Na_2SO_4$ 0.7 mM in water.

EMBODIMENTS

The convenient aspect concerning the cylindrical shape of the modular system described in FIG. 5 and consisting of the devices of the present invention, is given by the fact that during the day a part of the cylindrical system is always facing the direct radiation from the sun.

In a particular embodiment, the system described in FIG. 5 may be arranged in an array of devices placed alongside one another, forming a flat surface enclosed between two glass or plexiglass surfaces, inside which the water to be treated 6 may flow, flowing on the front of the device where the photo-anode 1 is present and on the back of the device where the cathode 5 is located.

In this case, the flat surface may be advantageously inclined, and integrated with a suitable fixed support structure, favoring the exposure to the incident solar radiation of the photo-anode 1.

Alternatively, the support structure may be mobile and integrated with a solar tracking apparatus so as to keep the radiation exposure of the system of the present invention constant throughout the day.

If the system structure is cylindrical 26 as described in FIG. 5, the pumping system for the water recirculation may be placed outside the system or integrated inside the cylindrical structure itself, creating a more compact apparatus.

The pumping system may be powered from the outside, or receive power from a photovoltaic panel, making the entire apparatus, consisting of the system of the present invention and the pumping system for the water recirculation, fully self-powered.

The flow of the aqueous solution 6 recirculating inside the system may be regulated starting from the pumping system. In the case of laminar flow, the probability that the $OH^-$ radicals come into contact with the polluting substances is greater, making COD abatement faster.

In a particular embodiment, to allow the system to operate even at nighttime, the latter may be integrated with a LED lighting system arranged so as to irradiate the photo-anodes so as to allow continuous operation. Such a lighting system may be powered from the outside or it may advantageously utilize the energy collected during the day by a photovoltaic system possibly supporting the apparatus.

INDUSTRIAL USE

In the light of the new regulations on sustainable water resources management, new techniques for the decontamination of wastewater are increasingly required, especially with regard to emerging pollutants, such as antibiotics, prescription and illegal drugs, and industrial chemicals.

This invention relates to a fully autonomous, sustainable, and industrially scalable system, capable of utilizing only solar energy and usable in support of current water treatment systems.

The catalyst used is characterized by a non-selective photocatalytic activity and, therefore, it may be used both for the treatment of water deriving from agricultural and industrial processes, of urban wastewater, and for the purification of groundwater.

The current passing through the two devices, used for the photocatalytic action and for the electrolysis of water, is a fraction of the current produced by the photovoltaic cells. The remaining current may be advantageously used to power a miniaturized electronic circuit which independently manages the polarization and depolarization cycles of the photo-anode, so as to always ensure an efficient operation and increase the useful life of the device.

The modular structure of the system makes it expandable according to the volume of water to be treated and adaptable to different types of water treatment plant.

A device which allows the pronounced photocatalytic action of $WO_3$ with an integrated biasing system, enabling the generation of $H_2$, while independently managing the depolarization cycles, is a technological advantage with wide application repercussions.

The invention claimed is:

1. A photo-electrochemical device for forming a photo-electrochemical system for photo-oxidation of organic substances and production of hydrogen from aqueous solution, which acts as an electrolyte, using solar radiation, completely stand-alone and modular, wherein the device integrates a tandem of a photo-active electrode, referred to as a photo-anode, and photovoltaic cells, electrically connected, the device comprising:
   a) a tandem configuration of a cell consisting of a photo-active electrode in contact with an aqueous solution capable of producing hydroxyl radicals from solar radiation so as to oxidize organic substances present in aqueous solution and a cell consisting of photovoltaic cells capable of generating a voltage required for the reduction of protons generated in hydrogen, developed on a second electrode in contact with the aqueous solution; and
   b) an integrated circuit powered by the photovoltaic cells for management of the polarization and depolarization cycles of the photo-active electrode, wherein the photovoltaic cells and a printed circuit do not come into contact with the aqueous solution due to an encapsulant placed along edges of the photo-anode and on a side of the printed circuit facing a cathode where electronic components, also protected by the encapsulant itself, are present.

2. The device according to claim 1, wherein the photo-anode consists of a glass substrate, a conductive film and a photo-active material, substantially a semiconductor oxide directly deposited on the conductive film.

3. The device according to claim 2, wherein the conductive film is made of fluorine-doped tin oxide (FTO), which is transparent to solar radiation, so as to allow such a radiation to reach the photovoltaic cells.

4. The device according to claim 2, wherein the photo-active material comprises colloidal tungsten trioxide (WO3) generated by means of the sol-gel method.

5. The device according to claim 1, wherein a second cell of the tandem integrated in said device integrates at least two silicon-based photovoltaic cells.

6. The device according to claim 5, wherein the at least two silicon-based photovoltaic cells have interdigitated contacts and are connected in series.

7. The device according to claim 1, wherein the second electrode consists of a metal cathode placed in contact with the aqueous solution.

8. The device according to claim 5, comprising a printed circuit on which the second cell of the tandem is welded to a surface facing the photo-anode, and on which electronic components are welded to a surface facing a cathode.

9. The device according to claim 6, comprising a printed circuit on which the at least two silicon-based photovoltaic cells are welded to a surface facing the photo-anode, and on which electronic components are welded to a surface facing a cathode.

10. The device according to claim 1, comprising a microcontroller among electronic components for the management of the polarization and depolarization cycles of the photo-anode.

11. A photo-electrochemical device for forming a photo-electrochemical system for photo-oxidation of organic substances and production of hydrogen from aqueous solution, which acts as an electrolyte, using solar radiation, completely stand-alone and modular, wherein the device integrates a tandem of a photo-active electrode, referred to as a photo-anode, and photovoltaic cells, electrically connected, the device comprising:
   a) a tandem configuration of a cell consisting of a photo-active electrode in contact with an aqueous solution capable of producing hydroxyl radicals from solar radiation so as to oxidize organic substances present in aqueous solution and a cell consisting of photovoltaic cells capable of generating a voltage required for the reduction of protons generated in hydrogen, developed on a second electrode in contact with the aqueous solution; and
   b) an integrated circuit powered by the photovoltaic cells for management of the polarization and depolarization cycles of the photo-active electrode,
   wherein the photo-electrochemical device comprises an external structure made of PVC which encloses a tandem device, constructed so as to make a system modular and combinable.

12. A photo-electrochemical system for photo-oxidation of organic substances and production of hydrogen from aqueous solution, which acts as an electrolyte, using solar radiation, completely stand-alone and modular, consisting of photo-electrochemical devices, each of which mainly comprises:
   a) a tandem configuration of a cell consisting of a photo-active electrode in contact with an aqueous solution capable of producing hydroxyl radicals from solar radiation so as to oxidize organic substances present in aqueous solution and a cell consisting of photovoltaic cells capable of generating a voltage required for the reduction of protons generated in hydrogen, developed on a second electrode in contact with the aqueous solution; and
   b) an integrated circuit powered by the photovoltaic cells for management of the polarization and depolarization cycles of the photo-active electrode,
   wherein the photo-electrochemical system is enclosed by a structure made of plexiglass or glass which contains said photo-electrochemical devices and the aqueous solution to be treated.

13. The photo-electrochemical system according to claim 12, which is placed by a side or directly integrated inside the structure, of a pumping apparatus for water recirculation.

14. The photo-electrochemical system according to claim 12, provided with a tank containing water to be treated.

15. The photo-electrochemical system according to claim 12, provided with a tank containing water decontaminated by a photo-catalytic action of the photo-electrochemical devices.

16. The photo-electrochemical system according to claim 12, provided with a duct for an output of the hydrogen produced by a cathode electrode.

* * * * *